US012752531B2

(12) United States Patent
Matsufuji

(10) Patent No.: US 12,752,531 B2
(45) Date of Patent: Oct. 6, 2026

(54) LIQUID DISCHARGE HEAD AND LIQUID DISCHARGE APPARATUS

(71) Applicant: Ryohta Matsufuji, Kanagawa (JP)

(72) Inventor: Ryohta Matsufuji, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 206 days.

(21) Appl. No.: 18/567,791

(22) PCT Filed: May 18, 2022

(86) PCT No.: PCT/IB2022/054590
§ 371 (c)(1),
(2) Date: Dec. 7, 2023

(87) PCT Pub. No.: WO2022/259063
PCT Pub. Date: Dec. 15, 2022

(65) Prior Publication Data
US 2024/0367436 A1 Nov. 7, 2024

(30) Foreign Application Priority Data
Jun. 8, 2021 (JP) ................................. 2021-095628
Apr. 13, 2022 (JP) ................................. 2022-066042

(51) Int. Cl.
*B41J 2/14* (2006.01)

(52) U.S. Cl.
CPC ......... *B41J 2/14233* (2013.01); *B41J 2/1433* (2013.01); *B41J 2002/14475* (2013.01); *B41J 2202/05* (2013.01)

(58) Field of Classification Search
CPC ........ B41J 2/04; B41J 2/14201; B41J 2/1623; B41J 2/17596; B41J 2/14209;
(Continued)

(56) References Cited

U.S. PATENT DOCUMENTS 5,119,110 A 6/1992 Arauchi et al.
5,798,774 A * 8/1998 Okada .................... B41J 2/1607 347/70
(Continued)

FOREIGN PATENT DOCUMENTS

CN 1522375 A 8/2004
CN 210716209 U 6/2020
(Continued)

OTHER PUBLICATIONS

Machine Translation of JP-2011201225-A retrieved from Espacenet Oct. 30, 2025. (Year: 2025).*
(Continued)

*Primary Examiner* — John P Zimmermann
(74) *Attorney, Agent, or Firm* — XSENSUS LLP

(57) ABSTRACT

A liquid discharge head includes a nozzle member having a nozzle, a valve to open and close the nozzle, a driver to drive the valve, a diaphragm between the valve and the driver, and a housing. The diaphragm vibrates in response to driving of the driver. The housing holds the nozzle member, the valve, the driver, and the diaphragm. The diaphragm has a thin film portion that is not held by the housing, and the thin film portion is thinner than a portion of the diaphragm held by the housing.

13 Claims, 13 Drawing Sheets

(58) Field of Classification Search
CPC ............... B41J 2/14451; B41J 2202/05; B41J 2202/02; B41J 2/04581; B41J 2/14233; B41J 2/161
See application file for complete search history.

(56) References Cited

U.S. PATENT DOCUMENTS

| | | | | |
|---|---|---|---|---|
| 6,273,552 | B1 * | 8/2001 | Hawkins .............. | B41J 2/14451 347/55 |
| 8,888,244 | B2 * | 11/2014 | Kang ..................... | B41J 2/1631 347/47 |
| 2006/0203042 | A1 * | 9/2006 | Murata .................. | B41J 2/1631 347/70 |
| 2007/0273719 | A1 * | 11/2007 | Yamashita ........... | B41J 2/04581 347/11 |
| 2012/0105522 | A1 | 5/2012 | Wallsten et al. | |

FOREIGN PATENT DOCUMENTS

| | | | |
|---|---|---|---|
| GB | 201313740 | | 9/2013 |
| JP | S6375381 | U | 5/1988 |
| JP | H03-159748 | A | 7/1991 |
| JP | H05146721 | A | 6/1993 |
| JP | 2004-142382 | A | 5/2004 |
| JP | 2007175966 | A | 7/2007 |
| JP | 2009035011 | A | 2/2009 |
| JP | 2010-241003 | A | 10/2010 |
| JP | 2011-201225 | A | 10/2011 |
| JP | 2011230122 | A | 11/2011 |
| JP | 2014051008 | A | 3/2014 |
| JP | 2019122955 | A | 7/2019 |
| JP | 2020-535005 | A | 12/2020 |
| WO | 2021/084254 | A1 | 5/2021 |

OTHER PUBLICATIONS

Office Action issued Aug. 28, 2025 in Chinese Patent Application No. 202280036330.9, 7 pages.
International Search Report and Written Opinion issued on Aug. 5, 2022 in PCT/IB2022/054590 filed on May 18, 2022, 9 pages.
Japanese Office Action issued Jan. 16, 2026 in corresponding Japanese Patent Application No. 2022-066042 (10 pages; with English translation).
Office Action issued Mar. 2, 2026 in corresponding Chinese Patent Application No. 202280036330.9 (4 pages).

* cited by examiner

LIQUID DISCHARGE HEAD AND LIQUID DISCHARGE APPARATUS

TECHNICAL FIELD

Aspects of the present disclosure relate to a liquid discharge head and a liquid discharge apparatus.

BACKGROUND ART

PTL 1 discloses an inkjet nozzle including a solenoid, a needle valve. The solenoid drives a moving core by excitation of the solenoid appropriately controlled to cause the needle valve to open and close the nozzle hole.

PTL 2 discloses a liquid discharge head that pressurizes a discharge liquid to be discharged from a nozzle and supplies the discharge liquid to a cavity communicating with the nozzle. The liquid discharge head includes a pin that closes the nozzle, an actuator that causes the pin to contact and separate from the nozzle, and a controller that controls the actuator. The discharge liquid is discharged from the nozzle as liquid droplets only while the pin is separated from the nozzle.

SUMMARY

Citation List

Patent Literature

[PTL 1]
Japanese Unexamined Patent Application Publication No. 2004-142382
[PTL 2]
Japanese Unexamined Patent Application Publication No. 2010-241003

SUMMARY OF INVENTION

Technical Problem

An object of the present disclosure is to provide a liquid discharge head that discharges liquid over a long flying distance while preventing damage to a driver caused by adhesion of the liquid to the driver.

Solution to Problem

A liquid discharge head includes a nozzle member having a nozzle, a valve to open and close the nozzle, a driver to drive the valve, a diaphragm between the valve and the driver, and a housing. The diaphragm vibrates in response to driving of the driver. The housing holds the nozzle member, the valve, the driver, and the diaphragm. The diaphragm has a thin film portion that is not held by the housing, and the thin film portion is thinner than a portion of the diaphragm held by the housing.

Advantageous Effects of Invention

According to the present disclosure, the liquid discharge head can be provided that discharges liquid over the long flying distance while preventing damage to the driver caused by adhesion of the liquid to the driver.

BRIEF DESCRIPTION OF DRAWINGS

A more complete appreciation of the embodiments and many of the attendant advantages and features thereof can be readily obtained and understood from the following detailed description with reference to the accompanying drawings

Figure 1:
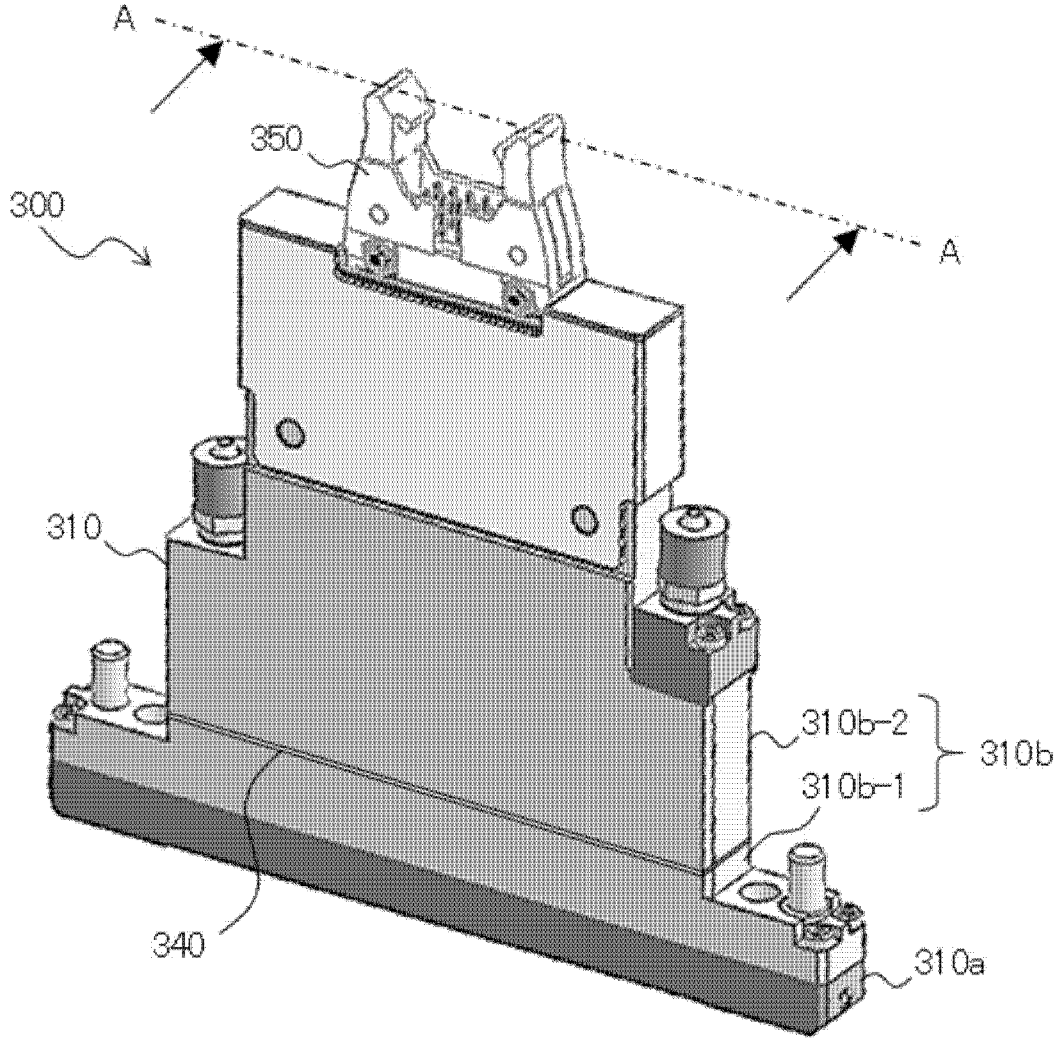
FIG. 1 is a perspective view illustrating an exterior of a liquid discharge head according to embodiments of the present disclosure.

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

DESCRIPTION OF EMBODIMENTS

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Embodiments of the present disclosure are described below with reference to the drawings. FIG. 1 is a perspective view illustrating an exterior of a liquid discharge head 300 according to an embodiment of the present disclosure.

The liquid discharge head 300 (hereinafter, simply referred to as a "head 300") includes a housing 310, a connector 350, and the like. The housing 310 includes a first housing 310*a* and a second housing 310*b* joined to the first housing 310*a*. The second housing 310*b* includes a housing part 310*b*-1 and a housing part 310*b*-2. The housing 310 is made of a material such as metal or resin.

The second housing 310*b* holds a diaphragm 340 such that the housing part 310*b*-1 and the housing part 310*b*-2 of the second housing 310*b* sandwich the diaphragm 340. The connector 350 is a terminal for communicating a control signal of the head 300, and is attached to an upper portion of the housing 310 in FIG. 1.

The housing 310 is an example of a housing of the head 300, the first housing 310*a* is an example of a first housing, and the second housing 310*b* is an example of a second housing.

Figure 2:
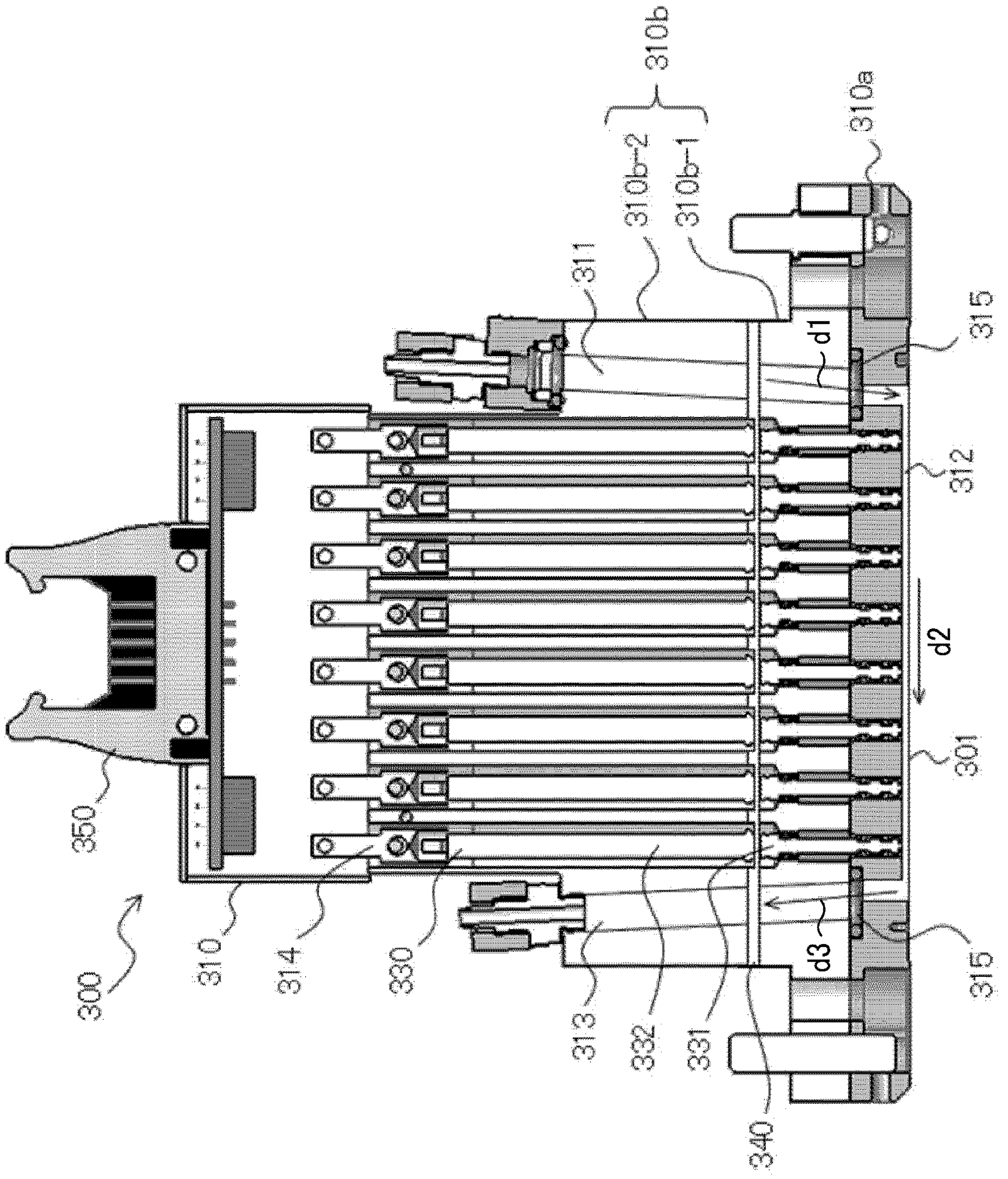
FIG. 2 is a cross-sectional view illustrating an interior of the liquid discharge head according to embodiments of the present disclosure.

FIG. 2 is a cross-sectional view illustrating an interior of the head 300 according to the present embodiment. This cross-sectional view is taken along line A-A in FIG. 1 as viewed in the direction indicated by arrows in FIG. 1.

As described above, the housing 310 of the head 300 includes the first housing 310*a* and the second housing 310*b* joined to the first housing 310*a*, and the second housing 310*b* includes the housing part 310*b*-1 and the housing part 310*b*-2. The first housing 310*a* holds a nozzle plate 301 defining a liquid chamber 312 described later. The nozzle plate 301 is a plate-shaped component having a nozzle 302 (see FIGS. 3A and 3B) to discharge liquid. The first housing 310*a* has the liquid chamber 312 that also serves as a flow path through which liquid is fed from a liquid supply port 311 to a liquid collection port 313 via the nozzle plate 301.

The second housing 310*b* includes the liquid supply port 311 and the liquid collection port 313 communicating with the liquid chamber 312 of the first housing 310*a*. The head 300 includes liquid discharge modules 330 to discharge liquid in the liquid chamber 312 from the nozzles 302. The liquid discharge modules 330 are disposed between the liquid supply port 311 and the liquid collection port 313. Each of the liquid discharge modules 330 faces the corresponding nozzle 302 on the nozzle plate 301 held by the first housing 310*a*. In the present embodiment, the eight liquid discharge modules 330 correspond to the eight nozzles 302 arranged in a row, respectively.

The liquid supply port 311 and the liquid collection port 313 of the second housing 310*b* are joined to the first housing 310*a* via seals 315 such as an O-ring made of rubber. The seal 315 prevents liquid from leaking out through the joint between the first housing 310*a* and the second housing 310*b*.

With the above-described configuration, pressurized liquid is taken into the liquid supply port 311 from the outside of the head 300, fed in the direction indicated by arrow d1 in FIG. 2, and supplied to the liquid chamber 312. The liquid supplied from the liquid supply port 311 is fed along the nozzle plate 301 in the direction indicated by arrow d2 in FIG. 2 in the liquid chamber 312. Then, the liquid that is not discharged from the nozzles 302 arranged along the liquid chamber 312 is collected through the liquid collection port 313 in the direction indicated by arrow d3 in FIG. 2.

The liquid discharge module 330 includes a needle valve 331 that opens and closes the nozzle 302 and a piezoelectric element 332 that drives the needle valve 331. The second housing 310*b* includes a restraint 314 at a position facing an upper end of the piezoelectric element 332 in FIG. 2. The restraint 314 is in contact with the upper end of the piezoelectric element 332 to define a fixed point of the piezoelectric element 332, that is, a base point when the piezoelectric element 332 is displaced (expands and contracts). A predetermined voltage is applied to the piezoelectric element 332 by a power source disposed inside or outside the liquid discharge modules 330. The piezoelectric element 332 expands and contracts in a predetermined cycle as the power source repeatedly applies and stops applying the predetermined voltage. Accordingly, the needle valve 331 opens and closes the nozzle 302 in the predetermined cycle, and liquid droplets are discharged from the nozzle 302 in the predetermined cycle. The piezoelectric element 332 that expands when the voltage is applied or contracts when the voltage is applied can be used.

The diaphragm 340 is disposed between the housing part 310*b*-1 and the housing part 310*b*-2 of the second housing 310*b*. The diaphragm 340 is positioned between the needle valve 331 and the piezoelectric element 332 so as to separate the needle valve 331 and the piezoelectric element 332 with the diaphragm 340. Ends of the needle valve 331 and the piezoelectric element 332 facing the diaphragm 340 are secured to the diaphragm 340 by bonding or the like. Note that the diaphragm 340 has a thickness that does not hinder the piezoelectric element 332 from being displaced. As the piezoelectric element 332 is driven, the diaphragm 340 transmits the displacement of the piezoelectric element 332 to the needle valve 331 (details are described later).

In the above-described configuration, as the piezoelectric element 332 is driven to move the needle valve 331 upward in FIG. 2, the nozzle 302 that has been closed by the needle valve 331 is opened to discharge liquid from the nozzle 302. As the piezoelectric element 332 is driven to move the needle valve 331 downward in FIG. 2, a tip of the needle valve 331 comes into contact with the nozzle 302 to close the nozzle 302 so that liquid is not discharged from the nozzle 302.

Although the head 300 including the eight nozzles 302 and the eight liquid discharge modules 330 is described with reference to FIG. 2, the number and arrangement of the nozzles 302 and the liquid discharge modules 330 are not limited to eight described above. For example, the number of the nozzles 302 and the liquid discharge modules 330 may be nine or more, or one rather than plural. Further, the nozzles 302 and the liquid discharge modules 330 may be arranged in multiple rows instead of one row.

As described above, in the present embodiment, the nozzle plate 301 includes multiple nozzles 302, and the multiple needle valves 331 and the multiple piezoelectric elements 332 are provided for the multiple nozzles 302, respectively. Thus, liquid can be applied to an object at a high speed.

The nozzle plate 301 is an example of a nozzle member, the needle valve 331 is an example of a valve, and the piezoelectric element 332 is an example of a driver.

Figure 3B:
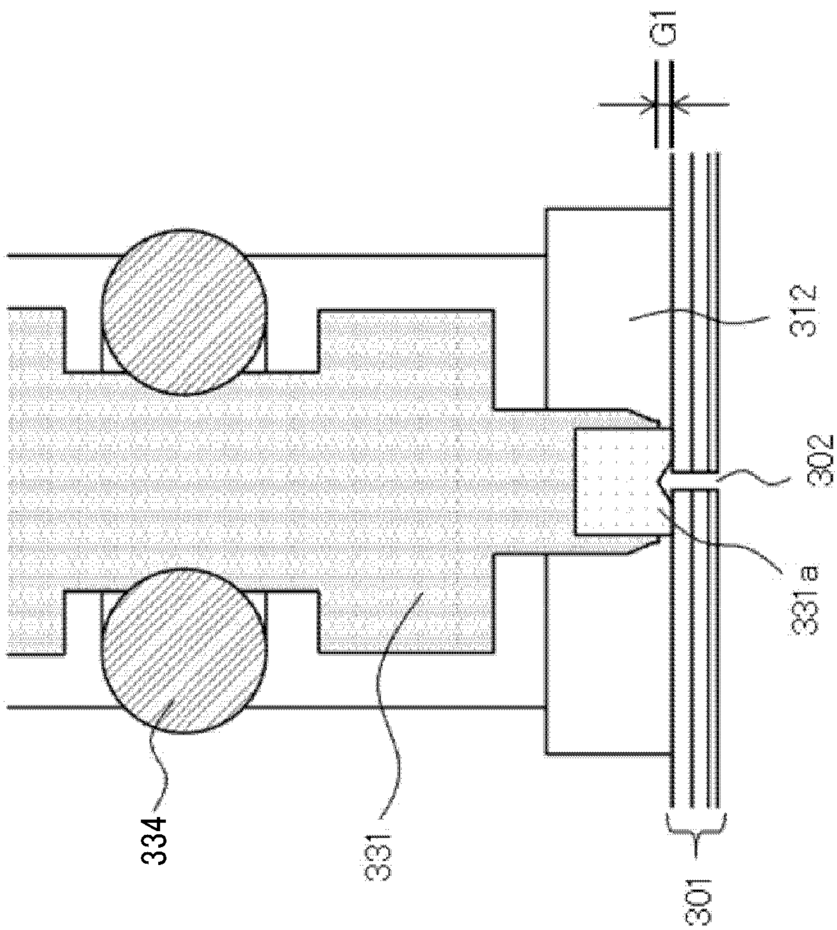
FIGS. 3A and 3B are cross-sectional views of a liquid discharge module of the liquid discharge head.
Figure 3A:
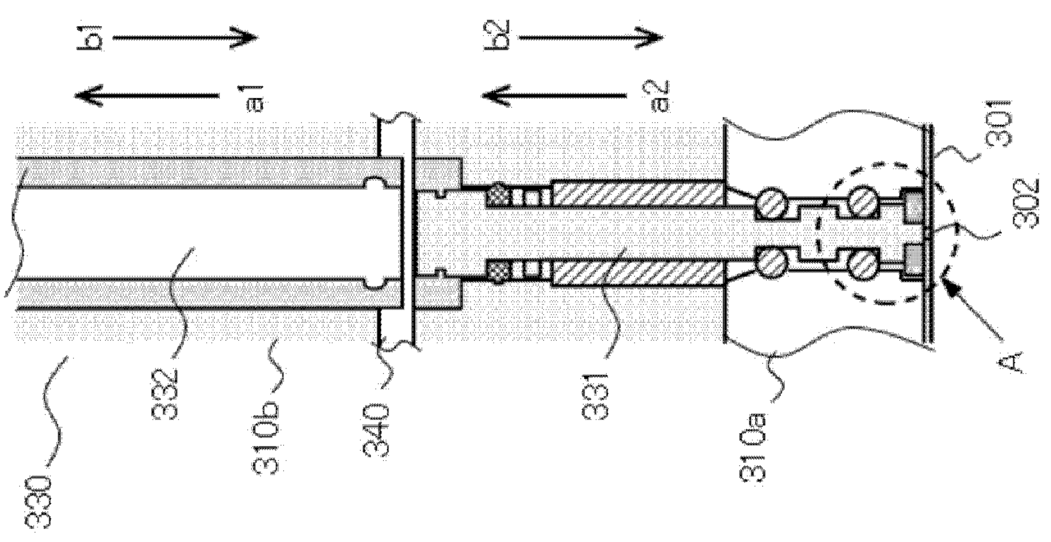

FIGS. 3A and 3B are cross-sectional views of the liquid discharge module 330 of the head 300. FIGS. 3A and 3B illustrate a single liquid discharge module 330. FIG. 3A is an enlarged view of a part of the liquid discharge module 330, and FIG. 3B is a detailed view illustrating portion A in FIG. 3A.

The liquid discharge module 330 includes the needle valve 331 and the piezoelectric element 332. As the piezoelectric element 332 operates in the direction indicated by arrow a1, the piezoelectric element 332 pulls up the diaphragm 340, one side of which is secured to a lower end of the piezoelectric element 332 in FIG. 3A, in the direction indicated by arrow a1. Since an upper end of the needle valve 331 in FIG. 3A is secured to the opposite side of the diaphragm 340, the needle valve 331 moves in the direction indicated by arrow a2 by a displacement amount G1 in FIG. 3B along with the movement of the diaphragm 340 in the direction indicated by arrow a1. Accordingly, an appropriate clearance is formed between the nozzle plate 301 and a tip 331*a* of the needle valve 331, and the liquid discharge module 330 discharges liquid in the liquid chamber 312 from the nozzle 302.

As the piezoelectric element 332 operates in the direction indicated by arrow b1, contrary to the above-described operation, the piezoelectric element 332 lowers the diaphragm 340 secured to the lower end of the piezoelectric element 332 in the direction indicated by arrow b1 in FIG. 3A. As the diaphragm 340 moves in the direction indicated by arrow b1, the needle valve 331 moves in the direction indicated by arrow b2. As a result, the tip 331*a* of the needle valve 331 comes into contact with the nozzle 302 to close the nozzle 302, so that the liquid discharge module 330 does not discharge liquid. The tip 331*a* of the needle valve 331 is formed of an elastic body such as fluororesin, and the pressing force from the piezoelectric element 332 in the direction indicated by arrow b1 causes the tip 331*a* of the needle valve 331 to close the nozzle 302.

As described above, the displacement amount G1 in the liquid discharge module 330 is several micrometers, which is extremely small. Further, the force generated by the piezoelectric element 332 is also small. When such a small clearance is controlled, if the load on the needle valve 331 or the piezoelectric element 332 is large, an appropriate clearance may not be formed between the nozzle 302 and the needle valve 331, and thus the clearance may become narrow. Accordingly, the fluid resistance becomes large, and the discharge performance may not be maintained in a desired state. Specifically, since the discharge speed of liquid becomes slow, the target amount and flying distance of discharged droplets may not be obtained.

Therefore, the diaphragm 340 according to the present embodiment has a configuration that prevents liquid in the liquid chamber 312 from invading the piezoelectric element 332 side from the needle valve 331 side and adhering to the piezoelectric element 332. Thus, the piezoelectric element 332 is prevented from being damaged. Further, the configuration of the diaphragm 340 does not hinder the needle valve 331 and the piezoelectric element 332 from being displaced to obtain the target amount and flying distance of the discharged droplets. Hereinafter, the configuration of the diaphragm 340 is described in detail.

Figure 4:
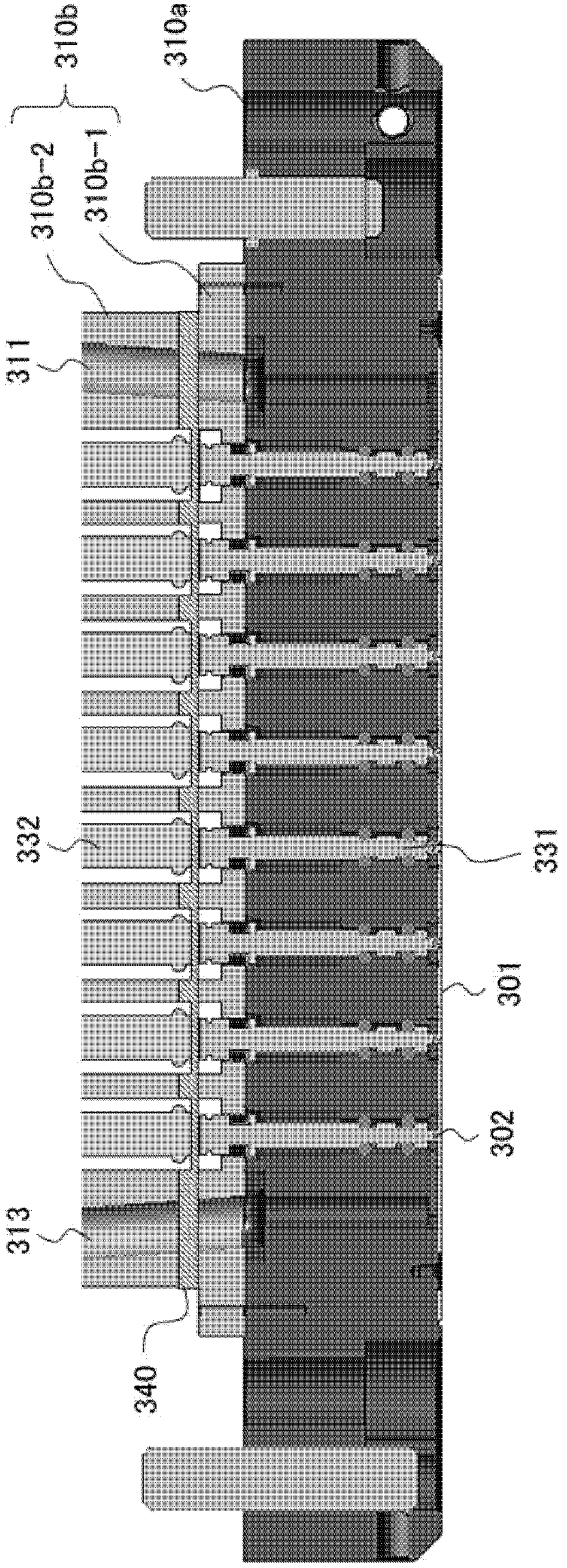
FIG. 4 is a cross-sectional view of a diaphragm of the liquid discharge head and the surrounding thereof according to a first embodiment of the present disclosure.

FIG. 4 is a cross-sectional view of the diaphragm 340 of the head 300 and the surrounding thereof according to a first embodiment of the present disclosure. Identical components are given identical reference numerals used in the above description, and redundant descriptions are omitted.

The diaphragm 340 according to the first embodiment has a thick portion and a thin film portion in the cross section as illustrated in FIG. 4. The thick portion is a portion of the diaphragm 340 in contact with the housing part 310*b*-1 and the housing part 310*b*-2, that is, a portion held by the second housing 310*b*. The thin film portion is a portion of the diaphragm 340 in contact with the needle valve 331 and the piezoelectric element 332, that is, a portion which is not held by the second housing 310*b*. The details are described with reference to the following drawing.

Figure 5:
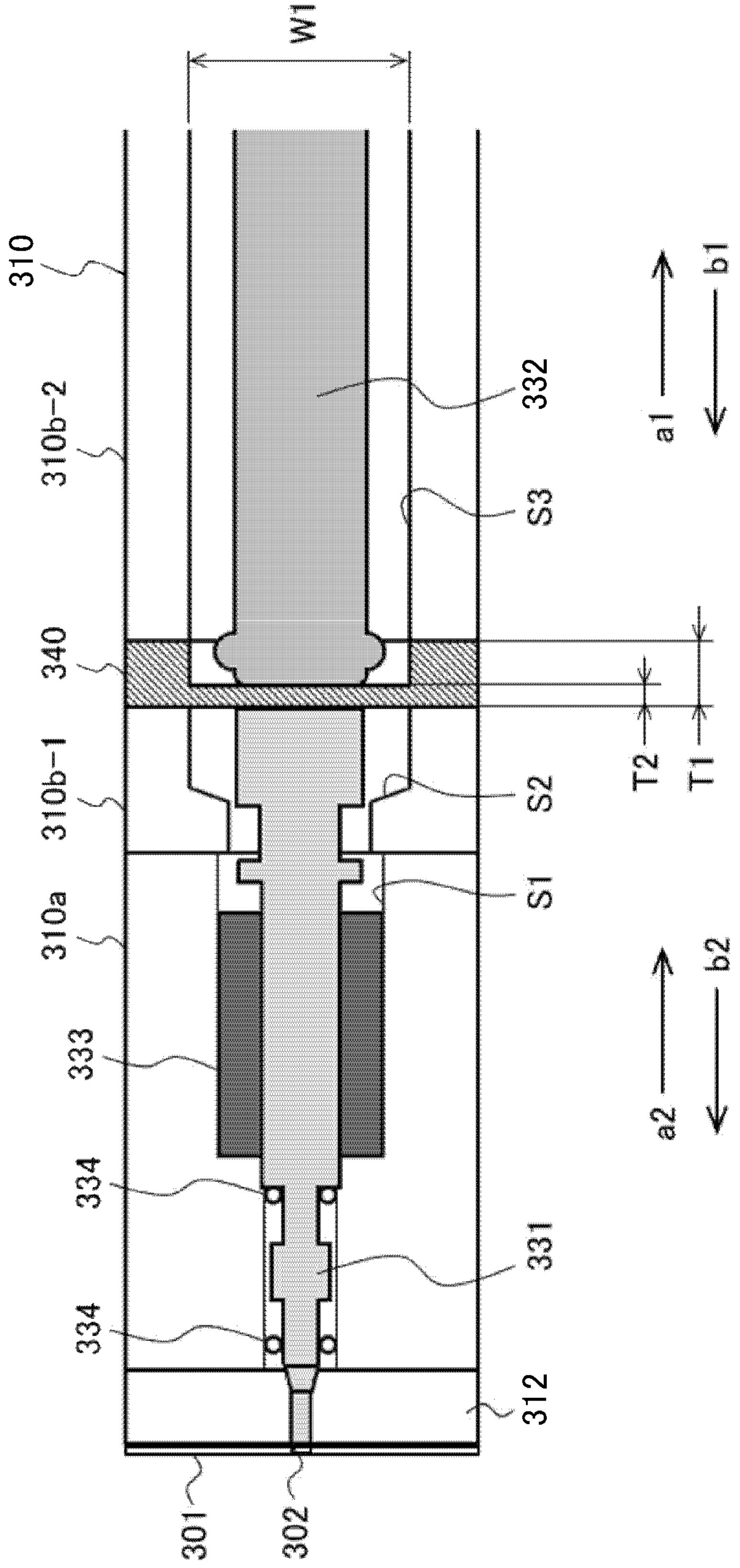
FIG. 5 is an enlarged cross-sectional view illustrating a part of the diaphragm and the surrounding thereof according to the first embodiment.

FIG. 5 is an enlarged cross-sectional view illustrating a part the diaphragm 340 and the surrounding thereof according to the first embodiment.

The housing 310 includes the first housing 310*a* and the second housing 310*b* including the housing part 310*b*-1 and the housing part 310*b*-2. The first housing 310*a* has a first accommodation space S1 accommodating the needle valve 331, a bearing 333 that movably supports the needle valve 331 in the directions indicated by arrow a2 and arrow b2, and O-rings 334 as a seal. In addition, the first housing 310*a* holds the nozzle plate 301 defining the liquid chamber 312. The nozzle plate 301 is the plate-shaped component having the nozzle 302 to discharge liquid.

The housing part 310*b*-1 is joined to an end of the first housing 310*a* on the side opposite to the nozzle plate 301. The housing part 310*b*-1 has a second accommodation space S2 accommodating a portion (upper portion in FIG. 4 or right portion in FIG. 5) of the needle valve 331. The first accommodation space S1 and the second accommodation space S2 are an example of a "valve accommodation space", and in the following description, the first accommodation space S1 and the second accommodation space S2 are collectively referred to as the valve accommodation space.

The housing part 310*b*-2 is joined to an end of the housing part 310*a*-1 on the side opposite to the first housing 310*a* via the diaphragm 340. The housing part 310*b*-2 has a third accommodation space S3 accommodating the piezoelectric element 332. The third accommodation space S3 has a width W1 that does not hinder the piezoelectric element 332 from moving in the directions indicated by arrow a1 and arrow b1. The third accommodation space S3 is an example of a "driver accommodation space", and in the following description, the third accommodation space S3 is also referred to as the driver accommodation space.

The diaphragm 340 has a thin film portion T2 in contact with the piezoelectric element 332, and the thin film portion T2 faces the third accommodation space S3. The thin film portion T2 has substantially the same width W1 as the third accommodation space S3. A portion other than the thin film portion T2 (i.e., the portion held by the housing part 310*b*-1 and the housing part 310*b*-2) is a thick portion T1.

The thin film portion T2 of the diaphragm 340 is formed to be approximately 3 to 20 μm thick by half-etching. The half-etching is effective when a designated shape is formed by dissolutive (corrosive) process in which the etching balance of each surface is intentionally controlled, or when only one surface of the material is etched halfway through the thickness.

With the above-described configuration, the diaphragm 340 completely separates the needle valve 331 and the piezoelectric element 332, that is, separates the valve accommodation space and the driver accommodation space. This configuration can prevent liquid in the liquid chamber 312 from invading the piezoelectric element 332 side from the needle valve 331 side. In other words, this configuration can prevent liquid in the valve accommodation space communicating with the liquid chamber 312 from invading the driver accommodation space. In addition, the needle valve 331 includes the O-rings 334 as a seal disposed between the diaphragm 340 and the nozzle plate 301 in the first accommodation space S1 as the valve accommodation space. The O-rings 334 seals the first accommodation space S1 against the invasion of liquid from the liquid chamber 312, and the diaphragm 340 is disposed over the O-rings 334 in FIG. 4 (on the right side in FIG. 5). Thus, the O-rings 334 and the diaphragm 340 doubly prevent liquid from invading the piezoelectric element 332. Further, the portion of the diaphragm 340 in contact with the needle valve 331 and the piezoelectric element 332 is the thin film portion, thereby reducing the displacement resistance of the diaphragm 340. As a result, the flying distance of liquid can be increased.

In FIG. 4, thin film portion T2 is disposed in a lower portion of the diaphragm 340 (on the side of the needle valve 331), which is the left side in FIG. 5, and the thick portion T1 projects upward (toward the piezoelectric element 332). In another embodiment, the diaphragm 340 may be disposed upside down. That is, the thick portion T1 may projects downward in FIG. 4 (toward the needle valve 331) with respect to the thin film portion T2 of the diaphragm 340.

As described above, the head 300 according to the present embodiment includes the nozzle plate 301 having the nozzle 302, the needle valve 331 to open and close the nozzle 302, the piezoelectric element 332 to drive the needle valve 331, the diaphragm 340 between the needle valve 331 and the piezoelectric element 332 to vibrate in response to the driving of the piezoelectric element 332, and the housing 310 to hold the nozzle plate 301, the needle valve 331, the piezoelectric element 332, and the diaphragm 340. The diaphragm 340 has the thin film portion T2 that is not held by the housing 310 (i.e., a portion within the width W1). The thin film portion T2 is thinner than a portion of the diaphragm 340 (portion other than the width W1) held by the housing 310.

Accordingly, the diaphragm 340 completely separates the needle valve 331 and the piezoelectric element 332 from each other to prevent liquid from invading the piezoelectric element 332. As a result, a liquid discharge head can be provided that discharges liquid over the long flying distance while preventing damage to the piezoelectric element 332 caused by adhesion of the liquid.

Further, as described above, the thin film portion T2 is the portion of the diaphragm 340 which is in contact with the piezoelectric element 332.

Accordingly, the target amount and flying distance of the discharged droplets can be obtained without reducing the displacement efficiency of the piezoelectric element 332.

As described above, the thin film portion T2 is a half-etched portion formed by half-etching.

Accordingly, the thin film portion T2 can be formed in a desired shape on one surface of the diaphragm 340.

As described above, the nozzle plate 301 is the plate-shaped component. Accordingly, the nozzle 302 is easily formed on the nozzle plate 301.

Figure 6:
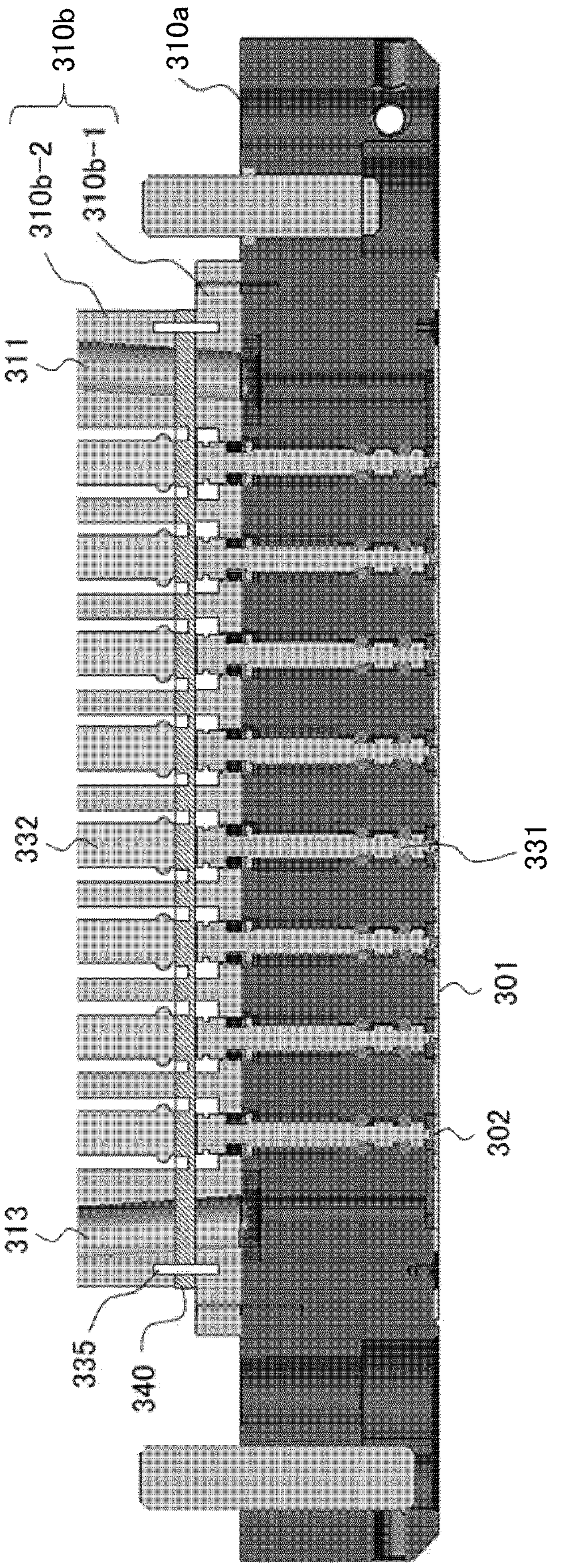
FIG. 6 is a cross-sectional view of a diaphragm of the liquid discharge head and the surrounding thereof according to a second embodiment of the present disclosure.

FIG. 6 is a cross-sectional view of the diaphragm 340 of the head 300 and the surrounding thereof according to a second embodiment of the present disclosure. Identical components are given identical reference numerals used in the above description, and redundant descriptions are omitted.

Similarly to the first embodiment, the diaphragm 340 according to the second embodiment also has a thick portion and a thin film portion in cross section. In the diaphragm 340 according to the second embodiment, the number of thick portions is increased compared to the first embodiment. That is, the diaphragm 340 according to the second embodiment has a thick portion sandwiched between the needle valve 331 and the piezoelectric element 332 in addition to the thick portion held by the housing part 310*b*-1 and the housing part 310*b*-2. The thin film portion is disposed only around the thick portion between the needle valve 331 and the piezoelectric element 332. The details are described with reference to the following drawing.

Figure 7:
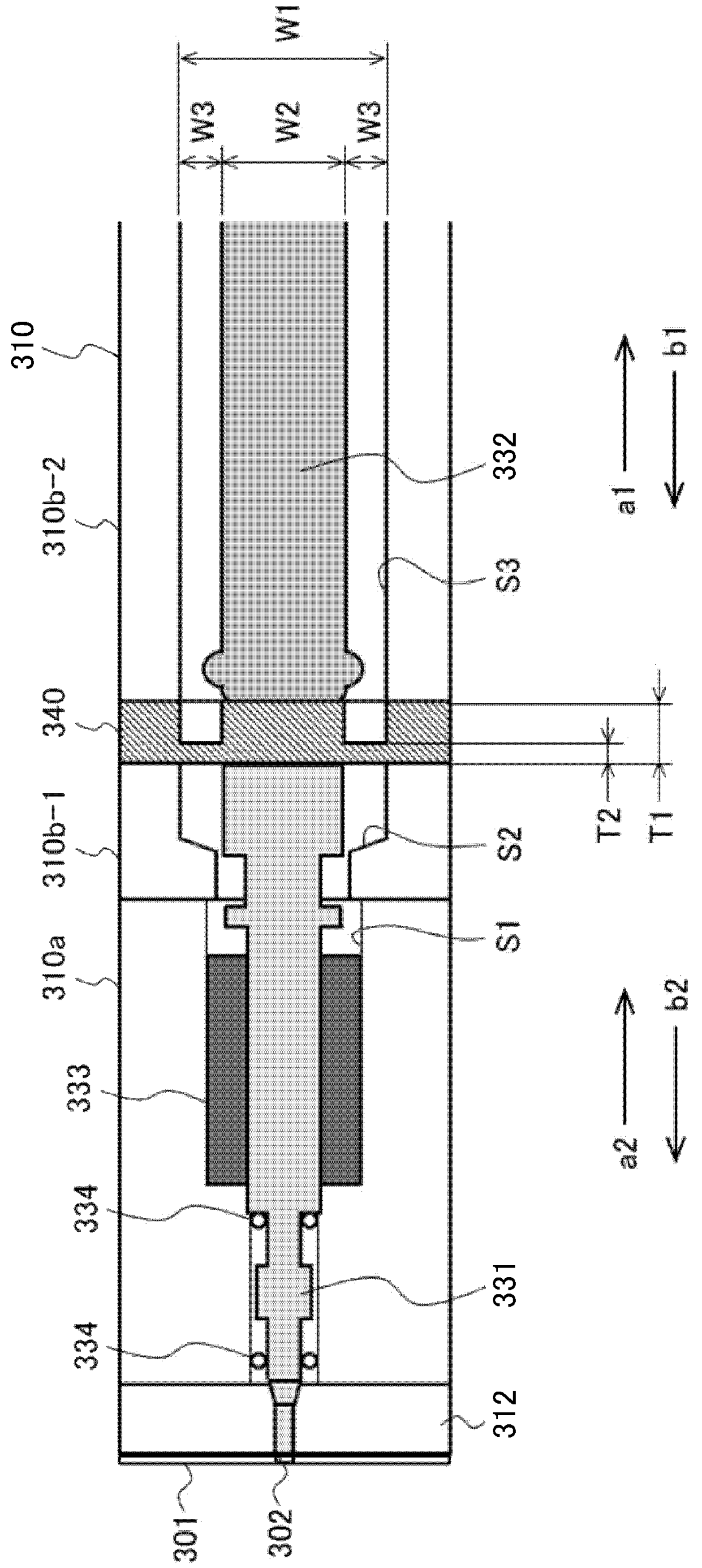
FIG. 7 is an enlarged cross-sectional view illustrating a part of the diaphragm and the surrounding thereof according to the second embodiment.

FIG. 7 is an enlarged cross-sectional view illustrating a part the diaphragm 340 and the surrounding thereof according to the second embodiment.

As described above, the second embodiment is different from the first embodiment particularly in the configuration of the thick portion T1 of the diaphragm 340. The diaphragm 340 has another thick portion T1 sandwiched between the needle valve 331 and the piezoelectric element 332 in addition to the thick portion T1 held by the housing part 310*b*-1 and the housing part 310*b*-2.

The thick portion T1 between the needle valve 331 and the piezoelectric element 332 has a width W2, and the width W2 substantially coincides with the width of the portion of the diaphragm 340 which is in contact with the piezoelectric element 332. The thin film portion T2 having the width W3 is disposed around the thick portion T1 having the width W2. Thus, the island-shaped thick portion T1 having the width W2 projects at the center of the third accommodation space S3 having the width W1. Hereinafter, this configuration is also referred to as an island structure portion. Also in the second embodiment, the thin film portion T2 of the diaphragm 340 can be formed by half-etching.

With the above-described configuration, the diaphragm 340 completely separates the needle valve 331 and the piezoelectric element 332, thereby preventing liquid in the liquid chamber 312 from invading the piezoelectric element 332 side from the needle valve 331 side. In addition, the O-rings 334 are fitted on the tip of the needle valve 331 to seal the first accommodation space S1 against the invasion of liquid from the liquid chamber 312, and the diaphragm 340 is disposed over the O-rings 334 in FIG. 6 (on the right side in FIG. 7). Thus, the O-rings 334 and the diaphragm 340 doubly prevent liquid from invading the piezoelectric element 332.

The island structure portion facilitates visually checking the assembly position of the piezoelectric element 332 to the diaphragm 340, thereby reducing the positional deviation of the axis of the piezoelectric element 332 when the piezoelectric element 332 is assembled to the diaphragm 340. The axis of the needle valve 331 is positioned by the bearing 333. For this reason, when the needle valve 331 is assembled to the diaphragm 340, the diaphragm 340 and the needle valve 331 can be aligned by a positioning pin 335 illustrated in FIG. 6, for example.

As a result, the above-described configuration can reduce the variation of the discharged droplets for each needle valve 331 even when the head 300 includes the eight needle valves 331 as illustrated in FIG. 6. In addition, the thin film portion T2 around the thick portion T1 having the width W2 can reduce the displacement resistance of the diaphragm 340, thereby increasing the flying distance of liquid.

In FIG. 6, the thin film portion T2 is disposed in a lower portion of the diaphragm 340 (on the side of the needle valve 331), which is the left side in FIG. 7, and the thick portion T1 projects upward (toward the piezoelectric element 332). In another embodiment, the diaphragm 340 may be disposed upside down. That is, the thick portion T1 may projects downward in FIG. 6 (toward the needle valve 331) with respect to the thin film portion T2 of the diaphragm 340.

As described above, the head 300 according to the present embodiment includes the nozzle plate 301 having the nozzle 302, the needle valve 331 to open and close the nozzle 302, the piezoelectric element 332 to drive the needle valve 331, the diaphragm 340 between the needle valve 331 and the piezoelectric element 332 to vibrate in response to the driving of the piezoelectric element 332, and the housing 310 to hold the nozzle plate 301, the needle valve 331, the piezoelectric element 332, and the diaphragm 340. The diaphragm 340 has the thin film portion T2 that is not held by the housing 310 (i.e., a portion within the width W1). The thin film portion T2 is thinner than a portion of the diaphragm 340 (portion other than the width W1) held by the housing 310.

Accordingly, the diaphragm 340 completely separates the needle valve 331 and the piezoelectric element 332 from each other to prevent liquid from invading the piezoelectric element 332. As a result, a liquid discharge head can be provided that discharges liquid over the long flying distance while preventing damage to the piezoelectric element 332 caused by adhesion of the liquid.

Further, as described above, the thin film portion T2 is disposed around the portion of the diaphragm 340 which is in contact with the piezoelectric element 332.

Accordingly, the target amount and flying distance of the discharged droplets can be obtained without reducing the displacement efficiency of the piezoelectric element 332.

As described above, the thin film portion T2 is a half-etched portion formed by half-etching.

Accordingly, the thin film portion T2 can be formed in a desired shape on one surface of the diaphragm 340.

Figure 8:
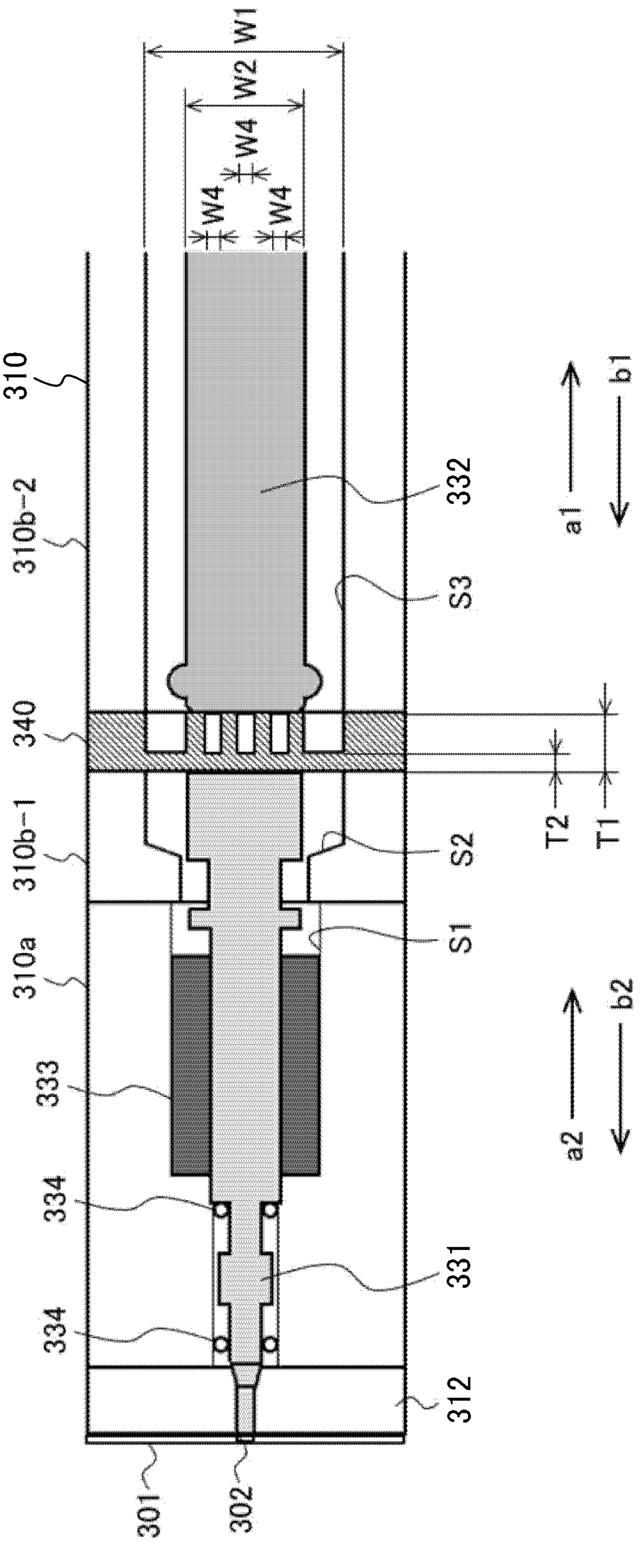
FIG. 8 is an enlarged cross-sectional view illustrating a part of a diaphragm and the surrounding thereof according to a third embodiment.

FIG. 8 is an enlarged cross-sectional view illustrating a part the diaphragm 340 and the surrounding thereof according to a third embodiment. Identical components are given identical reference numerals used in the above description, and redundant descriptions are omitted.

Similarly to the first and second embodiments, the diaphragm 340 according to the third embodiment also has a thick portion and a thin film portion in cross section. In the diaphragm 340 according to the third embodiment, the number of thin film portions is increased compared to the second embodiment. That is, in the diaphragm 340 according to the third embodiment, the thin film portion T2 is disposed around the portion of the diaphragm 340 which is in contact with the piezoelectric element 332. In addition, a part of the portion of diaphragm 340 which is in contact with the piezoelectric element 332 is also the thin film portion T2.

In other words, the diaphragm 340 according to the third embodiment has the thin film portions T2 having a width W4 within the width W2 (W4<W2) in addition to the thin film portion T2 around the portion of the diaphragm 340 which is in contact with the piezoelectric element 332. The width W2 substantially corresponds to the width of the portion of diaphragm 340 which is in contact with the piezoelectric element 332. The diaphragm 340 is bonded to the piezoelectric element 332 by an adhesive within the width W2.

As described above, the head 300 according to the present embodiment includes the nozzle plate 301 having the nozzle 302, the needle valve 331 to open and close the nozzle 302, the piezoelectric element 332 to drive the needle valve 331, the diaphragm 340 between the needle valve 331 and the piezoelectric element 332 to vibrate in response to the driving of the piezoelectric element 332, and the housing 310 to hold the nozzle plate 301, the needle valve 331, the piezoelectric element 332, and the diaphragm 340. The diaphragm 340 has the thin film portion T2 that is not held by the housing 310 (i.e., a portion within the width W1). The thin film portion T2 is thinner than a portion of the diaphragm 340 (portion other than the width W1) held by the housing 310.

Accordingly, the diaphragm 340 completely separates the needle valve 331 and the piezoelectric element 332 from each other to prevent liquid from invading the piezoelectric element 332. As a result, a liquid discharge head can be provided that prevents damage to the piezoelectric element 332 caused by adhesion of the liquid.

In the third embodiment, the thin film portion T2 is disposed around the portion of the diaphragm 340 which is in contact with the piezoelectric element 332. Accordingly, the target amount and flying distance of the discharged droplets can be obtained without reducing the displacement efficiency of the piezoelectric element 332.

Further, as described above, the diaphragm 340 has the multiple thin film portions T2 having the width W4 (W4<W2) in the portion of the diaphragm 340 which is in contact with the piezoelectric element 332. Accordingly, when the adhesive for bonding the diaphragm 340 and the piezoelectric element 332 overflows from the bonding surface therebetween, the adhesive enters recesses having the width W4. As a result, the adhesive can be prevented from being squeezed out.

Next, joining of the nozzle plate 301, the first housing 310*a*, the second housing 310*b*, and the diaphragm 340 is described.

The respective components may be bonded to each other by an adhesive (i.e., chemical joining or adhesive bonding), but the joining between the respective components without the adhesive (adhesive-less structure) is preferable in the configuration in which a pressurized liquid is supplied to the liquid chamber 312 like the head 300 according to the present embodiment or when liquid to be used is a solvent.

This is because the adhesive-less structure enhances the joining strength, which allows the liquid to be pressurized at higher pressure. As a result, liquid droplets can be discharged farther. Liquid may leak through the bonded portion of the adhesive due to chemical changes between the solvent and the adhesive, which does not occur in the adhesive-less structure.

Therefore, in the present embodiment, the first housing 310*a* and the nozzle plate 301, the second housing 310*b* and the diaphragm 340, and the first housing 310*a* and the second housing 310*b* are joined by material joining (in other words, metallurgical joining or welding). Specifically, these components are joined by diffusion bonding without using an adhesive. In the diffusion bonding, base materials are brought into close contact with each other and pressurized at a pressure that does not cause plastic deformation of the base materials and at a temperature equal to or lower than the melting point of the base materials to join the base materials by utilizing diffusion of atoms between the joined surfaces of the base materials.

An example of the diffusion bonding in the configurations according to the first to third embodiments is described below.

First, the first housing 310*a* and the nozzle plate 301 are stacked one on another and heated under vacuum, thereby joining the first housing 310*a* and the nozzle plate 301 together by diffusion bonding.

Next, the housing part 310*b*-1, the diaphragm 340, and the housing part 310*b*-2 are stacked one on another and heated under vacuum, thereby joining the second housing 310*b* and the diaphragm 340 together by diffusion bonding.

Next, the first housing 310*a* and the second housing 310*b* are joined together into the housing 310 by diffusion bonding.

As described above, in the present embodiment, the housing 310 and the nozzle plate 301 is joined by material joining.

In addition, as described above, the housing 310 and the diaphragm 340 is joined by material joining.

Further, as described above, the housing 310 includes the first housing 310*a* and the second housing 310*b*. The nozzle plate 301 is joined to the first housing 310*a* by material joining, and the diaphragm 340 is joined to the second housing 310*b* by material joining.

In addition, as described above, the first housing 310*a* and the second housing 310*b* are joined by material joining.

Further, as described above, the material joining is diffusion bonding.

Accordingly, the joining strength between the respective components is enhanced to allow the liquid to be pressurized at higher pressure. As a result, a liquid discharge head can be provided that discharges liquid droplets farther. In addition, the adhesive-less structure can resolve a concern that liquid leaks through the bonded portion due to a chemical change between the solvent and the adhesive.

Figure 9:
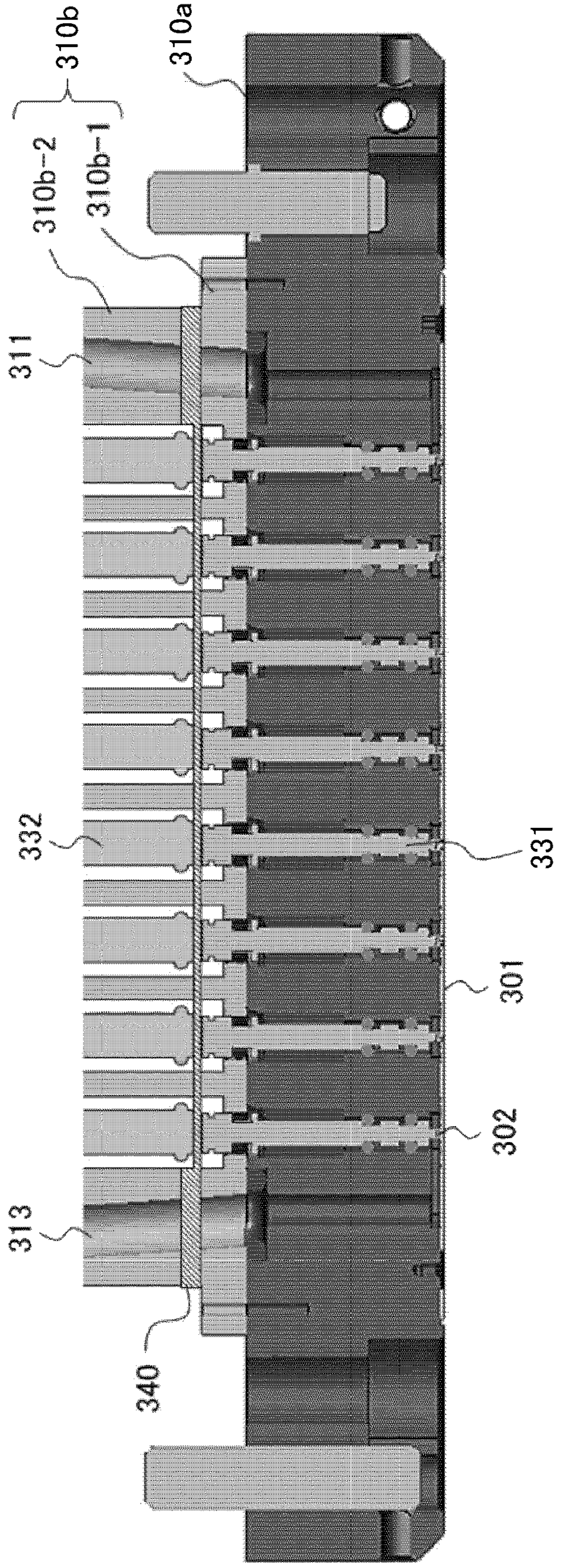
FIG. 9 is a cross-sectional view of a diaphragm of the liquid discharge head and the surrounding thereof according to a fourth embodiment of the present disclosure.

FIG. 9 is a cross-sectional view of the diaphragm 340 of the head 300 and the surrounding thereof according to a fourth embodiment of the present disclosure. Identical components are given identical reference numerals used in the above description, and redundant descriptions are omitted.

The diaphragm 340 according to the fourth embodiment has thick portions only at both ends of diaphragm 340 among portions held by the housing part 310*b*-1 and the housing part 310*b*-2, and has thin portions at the other portions.

Also with this configuration, the diaphragm 340 completely separates the needle valve 331 and the piezoelectric element 332, thereby preventing liquid from invading the piezoelectric element 332 side from the needle valve 331 side. Further, the portion of the diaphragm 340 in contact with the needle valve 331 and the piezoelectric element 332 is the thin film portion, thereby reducing the displacement resistance of the diaphragm 340. As a result, the flying distance of liquid can be increased.

Figure 10:
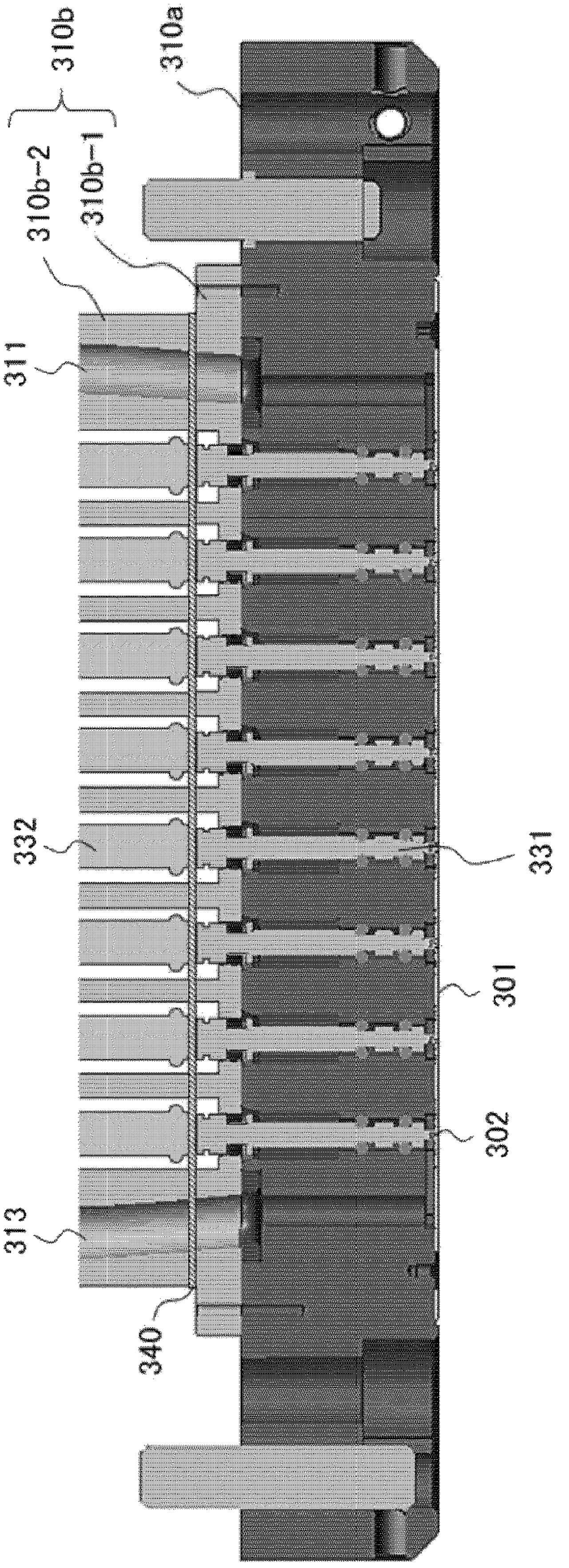
FIG. 10 is a cross-sectional view of a diaphragm of the liquid discharge head and the surrounding thereof according to a fifth embodiment of the present disclosure.

FIG. 10 is a cross-sectional view of the diaphragm 340 of the head 300 and the surrounding thereof according to a fifth embodiment of the present disclosure. Identical components are given identical reference numerals used in the above description, and redundant descriptions are omitted.

The diaphragm 340 according to the fifth embodiment is a thin film in which portions held by the housing part 310*b*-1 and the housing part 310*b*-2 and portions not held by the housing part 310*b*-1 and the housing part 310*b*-2 have the same thickness. Specifically, the diaphragm 340 is the thin film having the uniform thicknesses of 3 to 20 μm at both of the portions not held by the second housing 310*b* and the portions held by the second housing 310*b*.

For example, when the thin film is not formed by half-etching, a thin plate having the uniform thickness may be used as the diaphragm 340 between the needle valve 331 and the piezoelectric element 332 as illustrated in the fifth embodiment.

Also with this configuration, the diaphragm 340 completely separates the needle valve 331 and the piezoelectric element 332, thereby preventing liquid from invading the piezoelectric element 332 side from the needle valve 331 side. Further, the portion of the diaphragm 340 in contact with the needle valve 331 and the piezoelectric element 332 is the thin film portion having the thickness of 3 to 20 μm, thereby reducing the displacement resistance of the diaphragm 340. As a result, the flying distance of liquid can be increased.

In the present embodiment, the thickness of the diaphragm 340 is not necessarily uniform along the surface thereof, and may be partially non-uniform within a range of 3 to 20 μm.

As described above, the head 300 according to the present embodiment includes the nozzle plate 301 having the nozzle 302, the needle valve 331 to open and close the nozzle 302, the piezoelectric element 332 to drive the needle valve 331, the diaphragm 340 between the needle valve 331 and the piezoelectric element 332 to vibrate in response to the driving of the piezoelectric element 332, and the housing 310 to hold the nozzle plate 301, the needle valve 331, the piezoelectric element 332, and the diaphragm 340. The diaphragm 340 is the thin film having the thickness of 3 to 20 μm.

Accordingly, the diaphragm 340 completely separates the needle valve 331 and the piezoelectric element 332 from each other to prevent liquid from invading the piezoelectric element 332. As a result, a liquid discharge head can be provided that discharges liquid over the long flying distance while preventing damage to the piezoelectric element 332 caused by adhesion of the liquid.

The nozzle plate 301 as an example of the nozzle member is the plate-shaped component, and in the first to fifth embodiments, the nozzle plate 301 is a flat plate having a uniform thickness. The configuration of the nozzle plate 301 is not limited thereto. The nozzle plate having the nozzles may have any shape. For example, the nozzle plate may be a component including a flat plate and wall standing on the periphery of the flat plate. The nozzle plate may be a plate-shaped component having partially different thicknesses. The nozzle plate may be integrated with another component. The nozzle member is not necessarily the plate-shaped component and may be, for example, a cylindrical component.

Figure 11A:
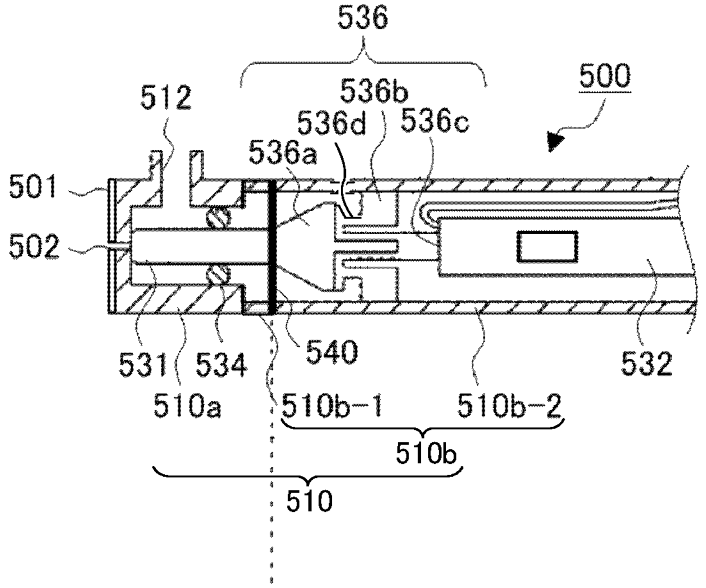
FIGS. 11A and 11B are cross-sectional views of a liquid discharge head according to a variation of the present disclosure.
Figure 11B:
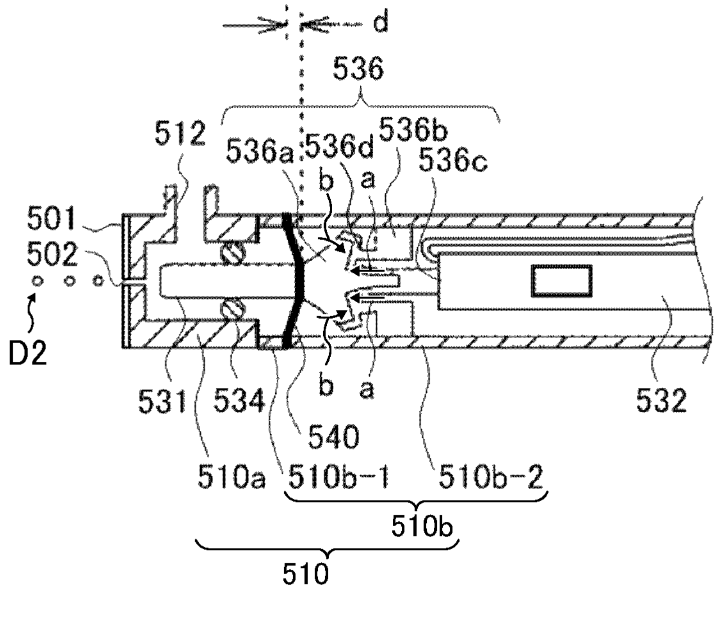

Next, a variation of the present embodiment is described with reference to FIGS. 11A and 11B. FIGS. 11A and 11B are cross-sectional views of a liquid discharge head 500 (hereinafter, simply referred to as a "head 500") according to the variation of the present embodiment. FIG. 11A is a cross-sectional view of the head 500 with a nozzle 502 closed, and FIG. 11B is a cross-sectional view of the head 500 with the nozzle 502 opened.

Reference numerals in the 500*s* are given to components illustrated in FIGS. 11A and 11B, and the components having substantially identical functions to those in the first to fifth embodiments have the same last two digits of the reference numerals. The variation is different from the first to fifth embodiments in that a reverse spring mechanism 536 is provided.

As illustrated in FIGS. 11A and 11B, a housing 510 of the head 500 includes a first housing 510*a* and a second housing 510*b* including a housing part 510*b*-1 and a housing part 510*b*-2.

The first housing 510*a* has the first accommodation space (a part of the valve accommodation space) accommodating a needle valve 531 as an example of a valve, an O-ring 534 as a seal, and the like. The first housing 510*a* holds a nozzle plate 501 defining a liquid chamber 512. The nozzle plate 501 is the plate-shaped component having the nozzle 502 to discharge liquid.

The housing part 510*b*-1 is joined to an end of the first housing 510*a* on the side opposite to the nozzle plate 501. The housing part 510*b*-1 has the second accommodation space (a part of the valve accommodation space) accommodating a portion (right portion in FIGS. 11A and 11B) of the needle valve 531. The first accommodation space and the second accommodation space construct the valve accommodation space.

The housing part 510*b*-2 is joined to an end of the housing part 310*b*-1 on the side opposite to the first housing 510*a* via a diaphragm 540. The housing part 510*b*-2 has the third accommodation space (driver accommodation space) accommodating the reverse spring mechanism 536 and a piezoelectric element 532.

The reverse spring mechanism 536 is an elastic member formed of rubber, soft resin, or thin metal plate which is appropriately processed to be deformable. The reverse spring mechanism 536 includes a deformable portion 536*a*, a secured portion 536*b*, a guide portion 536*c*, and a bent side 536*d*.

The deformable portion 536*a* has a substantially trapezoidal cross-section. The deformable portion 536*a* contacts a base end (right end in FIG. 11A) of the needle valve 531 via the diaphragm 540. The secured portion 536*b* is secured to the deformable portion 536*a* and the inner wall of the housing 510. The guide portion 536*c* couples the secured portion 536*b* and an end face of the piezoelectric element 532. The bent side 536*d* couples the long side (corresponding to the lower base of the trapezoid) of the trapezoidal deformable portion 536*a* and the secured portion 536*b*.

The reverse spring mechanism 536 has the above-described configuration. The piezoelectric element 532 expands when a predetermined voltage is applied to the piezoelectric element 532. As the piezoelectric element 532 expands, the guide portion 536*c* moves toward the nozzle 502, thereby pressing the center part of the bent side 536*d* of the deformable portion 536*a* in the direction indicated by arrows a in FIG. 11B. Accordingly, the deformable portion 536*a* deforms such that the periphery of the bent side 536*d* is pulled toward the piezoelectric element 532 in the direction indicated by arrows b in FIG. 11B.

As a result, the top portion, which corresponds to the upper base of the trapezoid, of the deformable portion 536*a* coupled to the needle valve 531 via the diaphragm 540 moves toward the piezoelectric element 532 as illustrated in FIG. 11B. Thus, the needle valve 531 is pulled toward the piezoelectric element 532 by a distance d illustrated in FIG. 11B, and the nozzle 502 is opened.

For example, when no voltage is applied to the piezoelectric element 532, the deformable portion 536*a* of the reverse spring mechanism 536 is in an expanded state (normal state) in which the needle valve 531 is biased toward the nozzle 502 by the elasticity of the deformable portion 536*a*, and the nozzle 502 is closed by the tip of the needle valve 531 as illustrated in FIG. 11A. Therefore, ink D2 is not discharged from the nozzle 502.

When a voltage is applied to the piezoelectric element 532, the distal end (left end in FIG. 11B) of the piezoelectric element 532 extends in the axial direction as illustrated in FIG. 11B, and the guide portion 536*c* moves toward the nozzle 502 in the axial direction. Accordingly, the center part of the bent side 536*d* of the deformable portion 536*a* is pushed toward the nozzle 502 in the direction indicated by arrows a in FIG. 11B, and the periphery of the bent side 536*d* near the inner wall of the housing 510 is retracted toward the piezoelectric element 532 in the direction indicated by arrows b in FIG. 11B. Thus, the deformable portion 536*a* is in a compressed state in which the distance between the bent side 536*d* and the top portion, which is coupled to the needle valve 531 via the diaphragm 540, of the deformable portion 536*a* is shortened, and the needle valve 531 is pulled toward the piezoelectric element 532 by the distance d illustrated in FIG. 11B.

As a result, a clearance is formed between the tip of the needle valve 531 and the nozzle 502, and the nozzle 502 is opened as illustrated in FIG. 11B. Accordingly, the liquid chamber 512 and the nozzle 502 communicate with each other, and the ink D2 is discharged from the nozzle 502.

The head 500 according to the variation also has the thin film portion T2. Similarly to the first to fifth embodiments, the thin film portion T2 is a portion of the diaphragm 540 which is in contact with the deformable portion 536*a*, and/or the thin film portion T2 is disposed around the portion of the diaphragm 540 which is in contact with the deformable portion 536*a*. In such a configuration, effects similar to those attained by the first to fifth embodiments can be attained.

Figure 12:
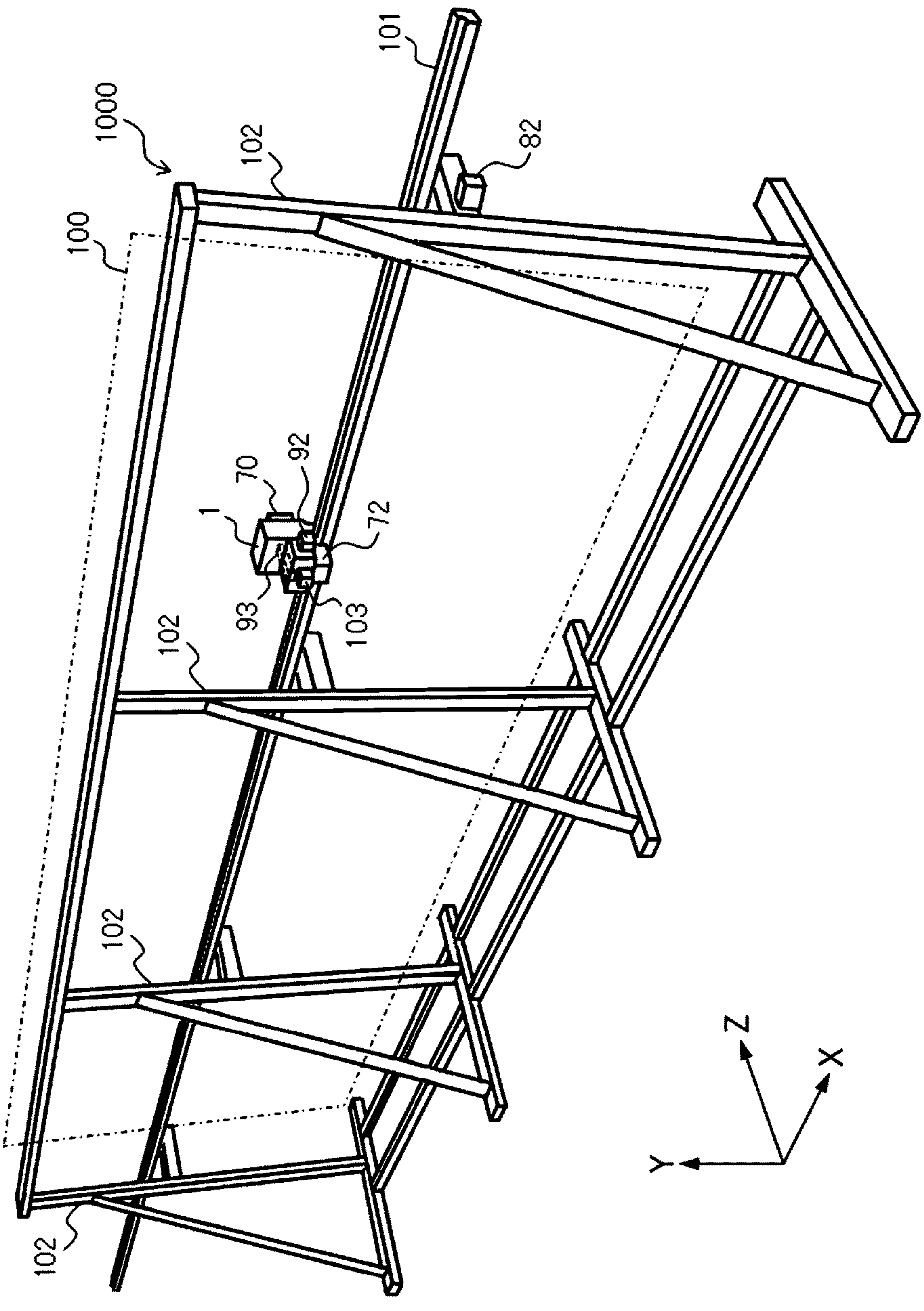
FIG. 12 is a schematic perspective view of a liquid discharge apparatus according to embodiments of the present disclosure.

FIG. 12 is a schematic perspective view of a printing apparatus 1000 as an example of a liquid discharge apparatus according to the embodiments of the present disclosure.

The printing apparatus 1000 is installed so as to face an object 100 on which images are drawn. The printing apparatus 1000 includes an X-axis rail 101, a Y-axis rail 102 intersecting the X-axis rail 101, and a Z-axis rail 103 intersecting the X-axis rail 101 and the Y-axis rail 102.

The Y-axis rail 102 movably holds the X-axis rail 101 in the Y direction (positive and negative directions). The X-axis rail 101 movably holds the Z-axis rail 103 in the X direction (positive and negative directions). The Z-axis rail 103 movably holds a carriage 1 in the Z direction (positive and negative directions).

Further, the printing apparatus 1000 includes a first Z-direction driver 92 and an X-direction driver 72. The first Z-direction driver 92 moves the carriage 1 in the Z direction along the Z-axis rail 103. The X-direction driver 72 moves the Z-axis rail 103 in the X direction along the X-axis rail 101. The printing apparatus 1000 further includes a Y-direction driver 82 that moves the X-axis rail 101 in the Y direction along the Y-axis rail 102. The X-direction driver 72, the Y-direction driver 82, and the Z-direction driver 92 are collectively referred to as a carriage driver to move the carriage 1. Further, the printing apparatus 1000 includes a second Z-direction driver 93 that moves a head holder 70 relative to the carriage 1 in the Z direction.

The printing apparatus 1000 described above discharges ink from the head 300 mounted on the head holder 70 while moving the carriage 1 in the X direction, the Y direction, and the Z direction, thereby drawing images on the object 100. The ink is an example of liquid. The movement of the carriage 1 and the head holder 70 in the Z direction is not necessarily parallel to the Z direction, and may be an oblique movement including at least a Z direction component.

Although the object 100 is flat in FIG. 12, the object 100 may have a surface shape which is a nearly vertical surface, a curved surface with the large radius of curvature, and a surface having a slight unevenness, such as a body of a car, a truck, or an aircraft.

Figure 13:
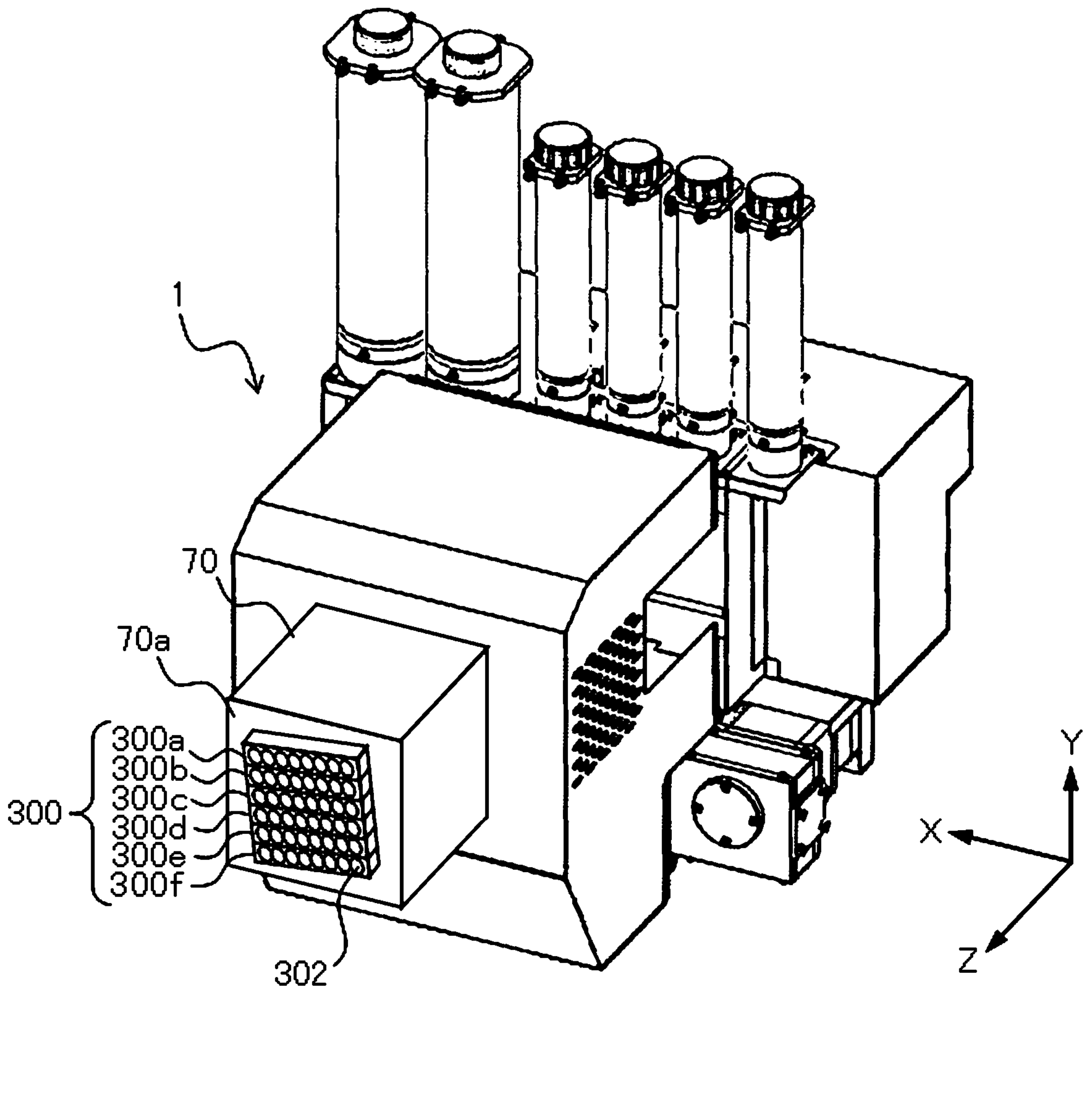
FIG. 13 is a schematic perspective view of a carriage of the liquid discharge apparatus according to embodiments of the present disclosure.

FIG. 13 is an overall perspective view of the carriage 1 of the printing apparatus 1000 illustrated in FIG. 12, in which the carriage 1 is viewed from the object 100.

The carriage 1 includes the head holder 70. Further, the carriage 1 is movable in the Z-direction (positive and negative directions) along the Z-axis rail 103 by driving force of the first Z-direction driver 92 as illustrated in FIG. 12.

The head holder 70 is movable in the Z-direction (positive and negative directions) with respect to the carriage 1 by driving force of the second Z-direction driver 93 as illustrated in FIG. 12. The head holder 70 includes a head fixing plate 70*a* to attach the head 300 to the head holder 70.

In the present embodiment, six heads 300*a* to 300*f* are attached to the head fixing plate 70*a* and stacked one on another. Each of the heads 300*a* to 300*f* is the head 300 described with reference to FIGS. 1 to 10.

Each of the heads 300*a* to 300*f* includes multiple nozzles 302. The number and type of ink used in the heads 300*a* to 300*f* is not particularly limited, and the ink may be different color for each head 300 or may be the same color for all heads 300. For example, when the printing apparatus 1000 is a coating apparatus using a single color, the inks used in the heads 300*a* to 300*f* may be the same color. The number of heads 300 is not limited to six, and may be more than six or less than six.

The heads 300 are secured to the head fixing plate 70*a* such that a nozzle row of each head 300 intersects the horizontal plane (i.e., X-Z plane) and the multiple nozzles 302 are obliquely arrayed with respect to the X-axis as illustrated in FIG. 13. Thus, the head 300 discharges ink from the nozzle 302 in a direction (positive Z direction in the present embodiment) intersecting the direction of gravity.

Examples of the liquid include a solution, a suspension, or an emulsion that contains, for example, a solvent, such as water or an organic solvent, a colorant, such as dye or pigment, a functional material, such as a polymerizable compound, a resin, or a surfactant, a biocompatible material, such as DNA, amino acid, protein, or calcium, or an edible material, such as a natural colorant.

These liquids can be used for, e.g., inkjet ink, coating paint, surface treatment solution, a liquid for forming components of electronic element or light-emitting element or a resist pattern of electronic circuit, or a material solution for three-dimensional fabrication.

The liquid discharge apparatus according to the present embodiment is not limited to the printing apparatus 1000 described above. For example, the liquid discharge head according to the above-described embodiments of the present disclosure may be attached to a tip of a robot arm of a multi-articulated robot that can freely move like a human arm by a plurality of joints.

In addition, the liquid discharge head according to the above-described embodiments may be mounted on an unmanned aerial vehicle such as a drone or a robot that can climb a wall, for example, to paint an object such as a wall.

The above-described embodiments are one of examples and, for example, the following Aspects 1 to 14 of the present disclosure can provide the following advantages.

Aspect 1

According to Aspect 1, a liquid discharge head (e.g., the head 300 or 500) includes a nozzle member (e.g., the nozzle plate 301 or 501) having a nozzle (e.g., the nozzle 302 or 502), a valve (e.g., the needle valve 331 or 531) to open and close the nozzle, a driver (e.g., the piezoelectric element 332 or 532) to drive the valve, a diaphragm (e.g., the diaphragm 340 or 540) between the valve and the driver, and the housing (e.g., the housing 310 or 510) The diaphragm vibrates in response to driving of the driver. The housing holds the nozzle member, the valve, the driver, and the diaphragm. The diaphragm has a thin film portion (e.g., the thin film portion T2) that is not held by the housing, and the thin film portion is thinner than a portion of the diaphragm held by the housing.

According to Aspect 1, a liquid discharge head can be provided that discharges liquid over the long flying distance while preventing damage to the driver caused by adhesion of the liquid to the driver.

Aspect 2

According to Aspect 2, in Aspect 1, the thin film portion (e.g., the thin film portion T2) is in contact with the driver (e.g., the piezoelectric element 332 or 532).

Aspect 3

According to Aspect 3, in Aspect 1, the thin film portion (e.g., the thin film portion T2) is disposed around a portion of the diaphragm (e.g., the diaphragm 340 or 540) which is in contact with the driver (e.g., the piezoelectric element 332 or 532).

According to Aspect 2 or 3, the target amount and flying distance of the discharged droplets can be obtained without reducing the displacement efficiency of the driver.

Aspect 4

According to Aspect 4, in any one of Aspects 1 to 3, the thin film portion (e.g., the thin film portion T2) is a half-etched portion.

According to Aspect 4, the thin film portion T2 can be formed in a desired shape on one surface of the diaphragm.

Aspect 5

According to Aspect 5, in any one of the Aspects 1 to 4, the housing (e.g., the housing 310 or 510) has a valve accommodation space (e.g., the accommodation space defined by the first housing 310*a* or 510*a*, and the housing part 310*b*-1 or 510*b*-1) accommodating the valve (e.g., the needle valve 331 or 531), a driver accommodation space (e.g., the accommodation space defined by the housing part 310*b*-2 or 510*b*-2) accommodating the driver (e.g., the piezoelectric element 332 or 532), and a liquid chamber (e.g., the liquid chamber 312 or 512) that accommodates liquid. The valve moves in the valve accommodation space with a tip of the valve positioned in the liquid chamber as the driver moves in the driver accommodation space. The diaphragm (e.g., the diaphragm 340 or 540) separates the valve accommodation space from the driver accommodation space.

Aspect 6

According to Aspect 6, in any one of the Aspects 1 to 5, the valve (e.g., the needle valve 331 or 531) includes a seal (e.g., the O-ring 334 or 534) between the diaphragm (e.g., the diaphragm 340 or 540) and the nozzle member (e.g., the nozzle plate 301 or 501).

According to Aspect 5 or 6, a liquid discharge head can be provided that discharges liquid over the long flying distance while preventing damage to the driver caused by adhesion of the liquid to the driver.

Aspect 7

According to Aspect 7, a liquid discharge head includes a nozzle member (e.g., the nozzle plate 301 or 501) having a nozzle (e.g., the nozzle 302 or 502), a valve (e.g., the needle valve 331 or 531) to open and close the nozzle, a driver (e.g., the piezoelectric element 332 or 532) to drive the valve, a diaphragm (e.g., the diaphragm 340 or 540) between the valve and the driver, and the housing (e.g., the housing 310 or 510). The diaphragm vibrates in response to driving of the driver. The housing holds the nozzle member, the valve, the driver, and the diaphragm. The diaphragm is a thin film having a thickness of 3 to 20 μm.

According to Aspect 7, a liquid discharge head can be provided that discharges liquid over the long flying distance while preventing damage to the driver caused by adhesion of the liquid to the driver.

Aspect 8

According to Aspect 8, in any one of the Aspects 1 to 7, the housing (e.g., the housing 310 or 510) and the nozzle member (e.g., the nozzle plate 301 or 501) are joined by material joining.

Aspect 9

According to Aspect 9, in any one of the Aspects 1 to 8, the housing (e.g., the housing 310 or 510) and the diaphragm (e.g., the diaphragm 340 or 540) is joined by material joining.

Aspect 10

According to Aspect 10, in any one of the aspects 1 to 9, the housing (e.g., the housing 310 or 510) includes a first housing (e.g., the first housing 310*a* or 510*a*) and a second housing (e.g., the second housing 310*b* or 510*b*). The nozzle member (e.g., the nozzle plate 301 or 501) is joined to the first housing by material joining, and the diaphragm (e.g., the diaphragm 340 or 540) is joined to the second housing by material joining.

Aspect 11

According to Aspect 11, in Aspect 10, the first housing (e.g., the first housing 310*a* or 510*a*) and the second housing (e.g., the second housing 310*b* or 510*b*) are joined by the material joining.

Aspect 12

According to Aspect 12, in any one of the Aspects 8 to 11, the material joining is diffusion bonding.

According to Aspects 8 to 12, the joining strength between the respective components is enhanced to allow the liquid to be pressurized at higher pressure. As a result, a liquid discharge head can be provided that discharges liquid droplets farther. In addition, the adhesive-less structure can resolve a concern that liquid leaks out through the bonded portion due to a chemical change between the solvent and the adhesive.

Aspect 13

According to Aspect 13, in any one of Aspects 1 to 12, the nozzle (e.g., the nozzle 302 or 502) includes multiple nozzles, the valve (e.g., the needle valve 331 or 531) includes multiple valves corresponding to the multiple nozzles, respectively, and the driver (e.g., the piezoelectric element 332 or 532) includes the multiple drivers corresponding to the multiple nozzles, respectively.

According to Aspect 13, liquid can be applied to an object at a high speed.

Aspect 14

According to Aspect 14, in any one of Aspects 1 to 13, the nozzle member (e.g., the nozzle plate 301 or 501) is a plate-shaped component.

According to Aspect 14, the nozzle is easily formed on the nozzle member.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

This patent application is based on and claim priority to PCT filing PCT/IB2022/054590, filed May 18, 2022, which claims priority to Japanese Patent Application Nos. 2021-095628, filed on Jun. 8, 2021, and 2022-066042, filed on Apr. 13, 2022, in the Japan Patent Office, the entire disclosure of each of which is hereby incorporated by reference herein.

REFERENCE SIGNS LIST

300, 500 Head (an example of a liquid discharge head)
301, 501 Nozzle plate (an example of a nozzle member or nozzle structure)
302, 502 Nozzle
310, 510 Housing
310*a*, 510*a* First housing
310*b*, 510*b* Second housing
331, 531 Needle valve (an example of a valve)
332, 532 Piezoelectric element (an example of a driver)
340, 540 Diaphragm
T1 Thick portion
T2 Thin film portion

The invention claimed is:

1. A liquid discharge head comprising:
a nozzle structure including a nozzle;
a valve to open and close the nozzle;
a driver to drive the valve;
a diaphragm between the valve and the driver, the diaphragm to vibrate in response to driving of the driver; and
a housing holding the nozzle structure, the valve, the driver, and the diaphragm,
wherein the diaphragm has a thin film portion that is not held by the housing, and the thin film portion is thinner than a portion of the diaphragm held by the housing,
the thin film portion is disposed around a portion of the diaphragm which is in contact with the driver, and
the portion of the diaphragm which is in contact with the driver is an island-shaped portion that is a same thickness as the portion of the diaphragm held by the housing and is secured to the driver.

2. The liquid discharge head according to claim 1,
wherein the thin film portion is a half-etched portion.

3. The liquid discharge head according to claim 1,
wherein the housing has a valve accommodation space accommodating the valve, a driver accommodation space accommodating the driver, and a liquid chamber that accommodates liquid,
wherein the valve is to move in the valve accommodation space with a tip of the valve positioned in the liquid chamber as the driver moves in the driver accommodation space, and
wherein the diaphragm separates the valve accommodation space from the driver accommodation space.

4. The liquid discharge head according to claim 3,
wherein the valve includes a seal between the diaphragm and the nozzle structure.

5. A liquid discharge head comprising:
a nozzle structure including a nozzle;
a valve to open and close the nozzle;
a driver to drive the valve;
a diaphragm between the valve and the driver, the diaphragm to vibrate in response to driving of the driver; and
a housing holding the nozzle structure, the valve, the driver, and the diaphragm,
wherein the diaphragm includes a thin film portion having a thickness of 3 to 20 μm,
the thin film portion is disposed around a portion of the diaphragm which is in contact with the driver, and
the portion of the diaphragm which is in contact with the driver is an island-shaped portion that is a same thickness as a portion of the diaphragm held by the housing and is secured to the driver.

6. The liquid discharge head according to claim 1,
wherein the housing and the nozzle structure have a structure which has been material joined.

7. The liquid discharge head according to claim 1,
wherein the housing and the diaphragm have a structure which has been material joined.

8. The liquid discharge head according to claim 1,
wherein the housing includes a first housing and a second housing,
wherein the nozzle structure and the first housing have a structure which has been material joined, and the diaphragm and the second housing have a structure which has been material joined.

9. The liquid discharge head according to claim 8, wherein the first housing and the second housing have a structure which has been material joined.

10. The liquid discharge head according to claim 6, wherein the housing and the nozzle structure have the structure which has been material joined as a structure which has been diffusion bonded.

11. The liquid discharge head according to claim 1, wherein the nozzle includes multiple nozzles, wherein the valve includes multiple valves corresponding to the multiple nozzles, respectively, and wherein the driver includes multiple drivers corresponding to the multiple nozzles, respectively.

12. The liquid discharge head according to claim 1, wherein the nozzle structure is a plate-shaped component.

13. A liquid discharge apparatus comprising the liquid discharge head according to claim 1; and
a carriage holding the liquid discharge head; and
a carriage driver to move the carriage.

* * * * *